Nov. 1, 1932.    R. L. LEWIS    1,885,844
LICENSE PLATE
Filed April 14, 1931
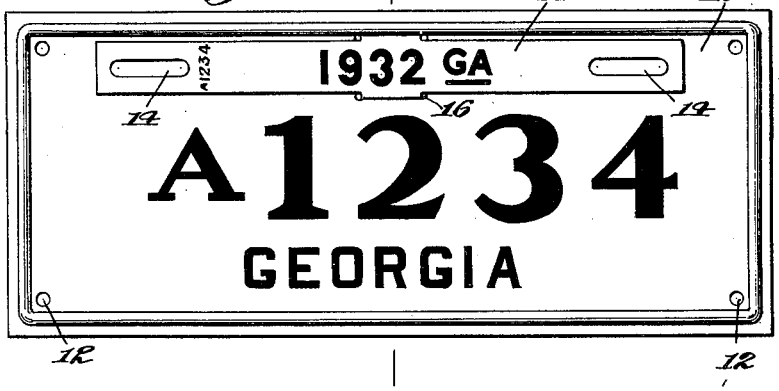
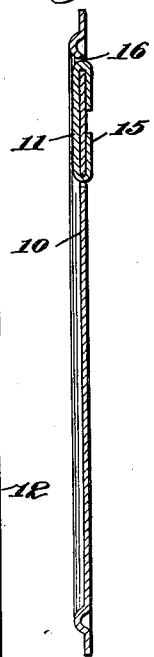
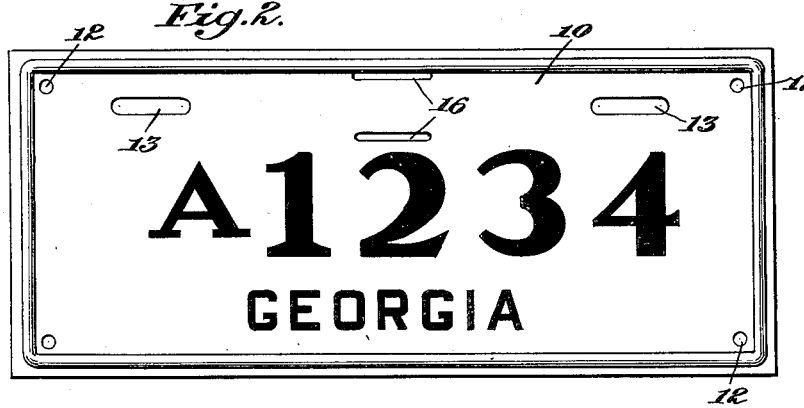
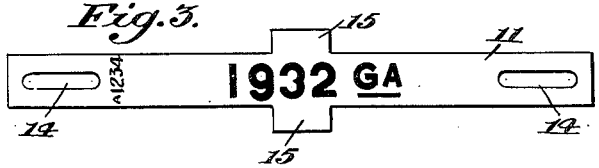
Inventor:
Roy L. Lewis,
by Edmund H. Parry Jr.
Atty.

Patented Nov. 1, 1932

1,885,844

UNITED STATES PATENT OFFICE

ROY L. LEWIS, OF ATLANTA, GEORGIA

LICENSE PLATE

Application filed April 14, 1931. Serial No. 530,081.

This invention relates to license plates for automobiles and other vehicles, and contemplates primarily a main permanent display plate and an improved form of removable auxiliary plate, together with efficient means for securing the same to the main plate.

While it has already been proposed to make license plates permanent by associating with them auxiliary changeable date plates in order to avoid a considerable waste of material and expense, most of such combination plates have been unsatisfactory. Heretofore the auxiliary plate very often loosened from the main plate and rattled or became lost. Such devices, furthermore, permitted of improper substitution by reason of the fact that they could readily be detached and lacked characteristics identifying the auxiliary with the main plate.

It is, therefore, the principal purpose of the present invention to provide a license plate and an auxiliary renewable date plate, such as overcomes the objections to previous devices of the same general type, the distinguishing features of my device residing in the design and construction of the auxiliary plate, and the manner of positioning and securing the same to the main plate.

It is a further object to provide main and auxiliary plates which can be used only in association with each other and only in the state of their issue, the arrangement being such as will enable detection of a spurious combination of incorrect main and auxiliary plates.

In the accompanying drawing I have illustrated one embodiment of my invention, but it will be understood that the shape and proportioning of parts, and the arrangement of display indicia may be varied so as to render the invention subject to a range of modification and equivalency determinable only by the appended claim.

Fig. 1 is a front view of a license plate embodying my invention;

Figs. 2 and 3 are front views of the separate elements of my license plate; and

Fig. 4 is an enlarged view in vertical section as taken on line 4—4 of Fig. 1.

Referring to the drawing, the numeral 10 indicates a license plate which in its general features may be of standard construction. An auxiliary plate 11 of elongated rectangular shape is provided, the size of which is proportioned to enable it to be positioned against the face of the main plate, preferably adjacent one edge, without obscuring any substantial area of the latter.

Suitable apertures of the usual type, such as the holes 12 and the slots 13, are provided in the main plate 10 to enable the plate to be secured to a support by fastening instrumentalities. The auxiliary plate is of sufficient size and is so positioned as to extend over at least one set of such apertures and is in turn provided with apertures, such as 14, adapted to register therewith. By this arrangement the auxiliary plate may, if desirable, be held in place on the main plate by the same fastening instrumentalities which secure the latter to a support, this preventing their ready removal. In any event, this construction permits the two plates to be secured together without the provision of apertures in the main plate additional to those usually provided.

As will be noted from an inspection of Figs. 2 and 3, the auxiliary plate 11 is provided with extensions constituting tabs 15. The main plate is provided with slots 16 through which the tabs may be inserted and bent, as shown in Fig. 4, to more securely hold the two together.

The main plate bears the license number and the auxiliary plate the year number. To prevent the use of improper plates together, the auxiliary tag should also show the license number corresponding to that displayed on the main plate. Both plates should bear the name of the issuing State and preferably should be of distinctive and different colors, this preventing the use of one or the other with a spurious complementary plate. It is presumed, also, that the color of the date plate will change with each new yearly issue.

With a combination license plate having the above-described characteristics, it will be understood that the main plate will remain permanently on an automobile. The auxiliary date plate will be issued each year with a number corresponding to that of the main plate, and while having a size and color sufficient to enable ready detection of the use of improper plates in combination, will not occupy so much of the face of the main plate as to hide or require any decrease in size of the indicia of the latter. Furthermore, by reason of the securing means provided the two plates will not rattle, nor can they be accidentally or unscrupulously separated.

I claim:

In a license tag, the combination of a rectangular main display plate having spaced apart apertures adjacent one of the long edges thereof through which fastening means may be inserted to secure the plate to a support, and additional apertures intermediate said first apertures and a narrow rectangular supplemental display plate located on the face of the main plate adjacent said long edge thereof with its ends overlying the apertures in the main plate and provided with apertures registering therewith, and tabs on the side of said supplemental plate for insertion in said additional set of apertures to secure the plates together.

In testimony whereof, I affix my signature.

ROY L. LEWIS.